(12) United States Patent
Ayabe et al.

(10) Patent No.: US 11,960,234 B2
(45) Date of Patent: Apr. 16, 2024

(54) IMAGE FORMING APPARATUS IN WHICH A DOCUMENT CAN BE PLACED MORE EASILY ON A RECEIVING SURFACE

(71) Applicant: FUJIFILM CORPORATION, Tokyo (JP)

(72) Inventors: Takuma Ayabe, Kanagawa (JP); Tsutomu Shiihara, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/051,524

(22) Filed: Nov. 1, 2022

(65) Prior Publication Data

US 2023/0315000 A1 Oct. 5, 2023

(30) Foreign Application Priority Data

Mar. 31, 2022 (JP) ................................. 2022-060846

(51) Int. Cl.
*G03G 21/16* (2006.01)
(52) U.S. Cl.
CPC ..... *G03G 21/1647* (2013.01); *G03G 21/1619* (2013.01); *G03G 21/1633* (2013.01)
(58) Field of Classification Search
CPC ........... G03G 21/1647; G03G 21/1619; G03G 21/1633
See application file for complete search history.

(56) References Cited

U.S. PATENT DOCUMENTS

| 2008/0012803 | A1* | 1/2008 | Nakano | G03G 21/1619 345/82 |
| 2008/0025758 | A1* | 1/2008 | Sato | G03G 21/1619 399/119 |
| 2008/0286002 | A1* | 11/2008 | Akiyama | G03G 21/1633 399/114 |
| 2014/0328605 | A1* | 11/2014 | Katsuyama | G03G 21/1647 399/81 |
| 2021/0302899 | A1 | 9/2021 | Sato et al. | |

FOREIGN PATENT DOCUMENTS

| JP | 2011-221503 A | 11/2011 |
| JP | 2021-163982 A | 10/2021 |

* cited by examiner

*Primary Examiner* — Sandra Brase
(74) *Attorney, Agent, or Firm* — SOLARIS Intellectual Property Group, PLLC

(57) ABSTRACT

An image forming apparatus includes: an apparatus body having a receiving surface on which a document is placed and that is provided on a rear portion of an upper surface, the rear portion being positioned behind a front end of the upper surface; a reading unit provided on the rear portion such that the reading unit is openable and closable, the reading unit reading an image on the document while transporting the document; an inclined surface on which no operation unit is disposed, the inclined surface being continuously inclined downward from a front end of the rear portion to the front end of the upper surface; and a projecting portion provided on a front portion of the apparatus body at a position on a first side of the inclined surface in a left-right direction, the projecting portion projecting forward and upward with respect to the inclined surface.

20 Claims, 11 Drawing Sheets

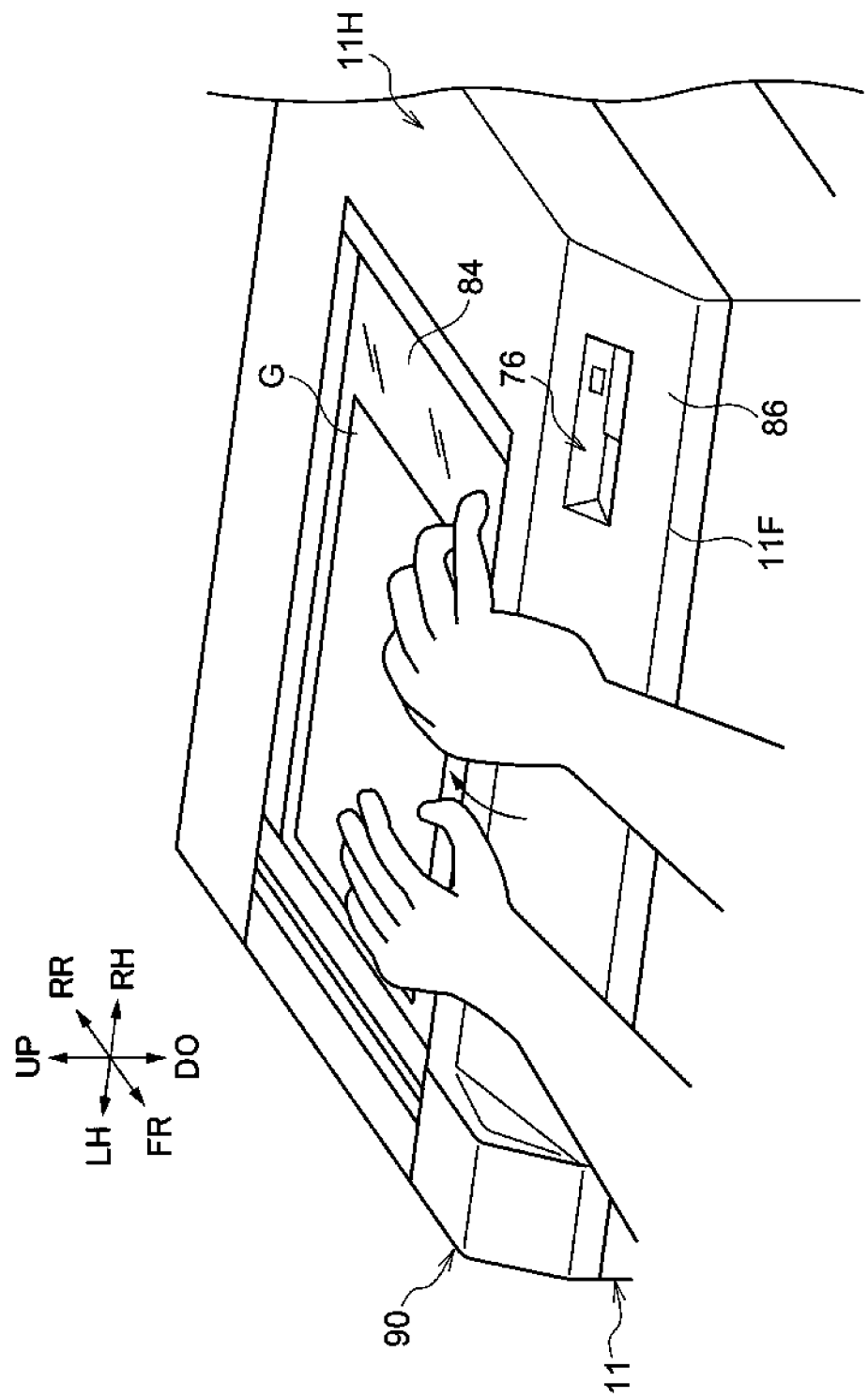

IMAGE FORMING APPARATUS IN WHICH A DOCUMENT CAN BE PLACED MORE EASILY ON A RECEIVING SURFACE

CROSS-REFERENCE TO RELATED APPLICATIONS

This application is based on and claims priority under 35 USC 119 from Japanese Patent Application No. 2022-060846, filed on Mar. 31, 2022, the entire disclosure of which is incorporated by reference herein.

BACKGROUND

(i) Technical Field

The present disclosure relates to an image forming apparatus.

(ii) Related Art

Japanese Unexamined Patent Application Publication No. 2011-221503 describes an image forming apparatus including: an image forming unit that forms an image on a sheet; a document reading unit that reads a document image for the image formed by the image forming unit; a housing accommodating the image forming unit and having a front surface that faces a user in a normal operation and an upper surface on which the document reading unit is disposed; an automatic document transport device disposed on the upper surface of the housing and that automatically transports a document sheet having the document image to the document reading unit; and a transparent table disposed at or near an intersection between the front surface and the upper surface of the housing.

Japanese Unexamined Patent Application Publication No. 2021-163982 describes an image forming system having a top surface, the image forming system including: a reader opening-closing portion that opens and closes a reader configured to read a document image and disposed on the top surface; an operation unit that is freely mounted on the top surface and that receives an operation performed by a user in an image forming process; a power supply cable that is connected to the operation unit and that supplies electric power to the operation unit; a cable accommodating portion that accommodates the cable and that is formed in the top surface to extend from a rear surface toward a front surface of the image forming system at a position adjacent to the reader opening-closing portion in an orthogonal direction orthogonal to a direction from the rear surface toward the front surface and a vertical direction when the top surface is viewed in the vertical direction; a cable cover that covers the cable accommodated in the cable accommodating portion; a retaining portion that retains the cable in the accommodating portion; and an opening formed at the front of the cable cover and allowing the cable to extend out of the cable accommodating portion. When the cable cover is viewed in the vertical direction, one of edges defining the opening that is adjacent to the reader opening-closing portion in the orthogonal direction is farther away from the reader opening-closing portion in the orthogonal direction than an end of an outer peripheral surface of the cable retained by the retaining portion, the end being adjacent to the reader opening-closing portion in the orthogonal direction.

SUMMARY

An example of an image forming apparatus includes: an apparatus body having a receiving surface on which a document is placed and that is provided on a rear portion of an upper surface, the rear portion being positioned behind a front end of the upper surface; a reading unit provided on the rear portion such that the reading unit is openable and closable, the reading unit reading an image on the document while transporting the document; and an inclined surface on which no operation unit used by a user to perform an input operation is disposed, the inclined surface being continuously inclined downward from a front end of the rear portion to the front end of the upper surface. The image forming apparatus may not be user-friendly in an operation of placing the document on the receiving surface from the front of the upper surface of the apparatus body.

Aspects of non-limiting embodiments of the present disclosure relate to a structure in which the document may be placed on the receiving surface from the front of the upper surface of the apparatus body more easily than when only the inclined surface is formed from one end to the other end of a front portion of the upper surface of the apparatus body in the left-right direction.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including: an apparatus body having a receiving surface on which a document is placed and that is provided on a rear portion of an upper surface, the rear portion being positioned behind a front end of the upper surface; a reading unit provided on the rear portion such that the reading unit is openable and closable, the reading unit reading an image on the document while transporting the document; an inclined surface on which no operation unit used by a user to perform an input operation is disposed, the inclined surface being continuously inclined downward from a front end of the rear portion to the front end of the upper surface; and a projecting portion provided on a front portion of the apparatus body at a position on a first side of the inclined surface in a left-right direction, the projecting portion projecting forward and upward with respect to the inclined surface.

BRIEF DESCRIPTION OF THE DRAWINGS

An exemplary embodiment of the present disclosure will be described in detail based on the following figures, wherein:

FIG. 11 is a perspective view illustrating a manner in which a document is placed on a document receiving surface according to the exemplary embodiment.

DETAILED DESCRIPTION

An exemplary embodiment of the present disclosure will now be described with reference to the drawings.

Image Forming Apparatus 10

Figure 1:
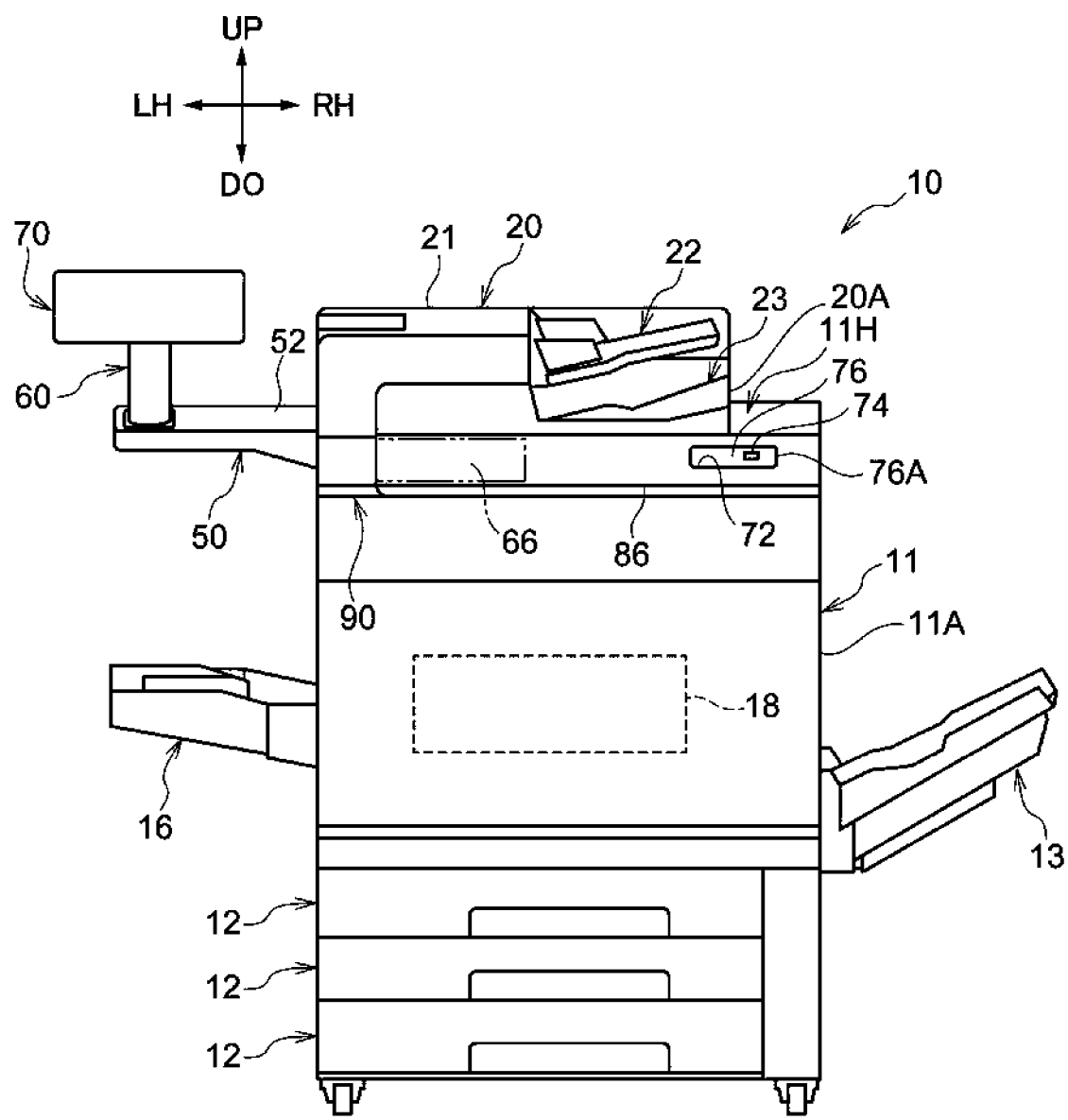
FIG. 1 is a front view of an image forming apparatus according to an exemplary embodiment.
Figure 2:
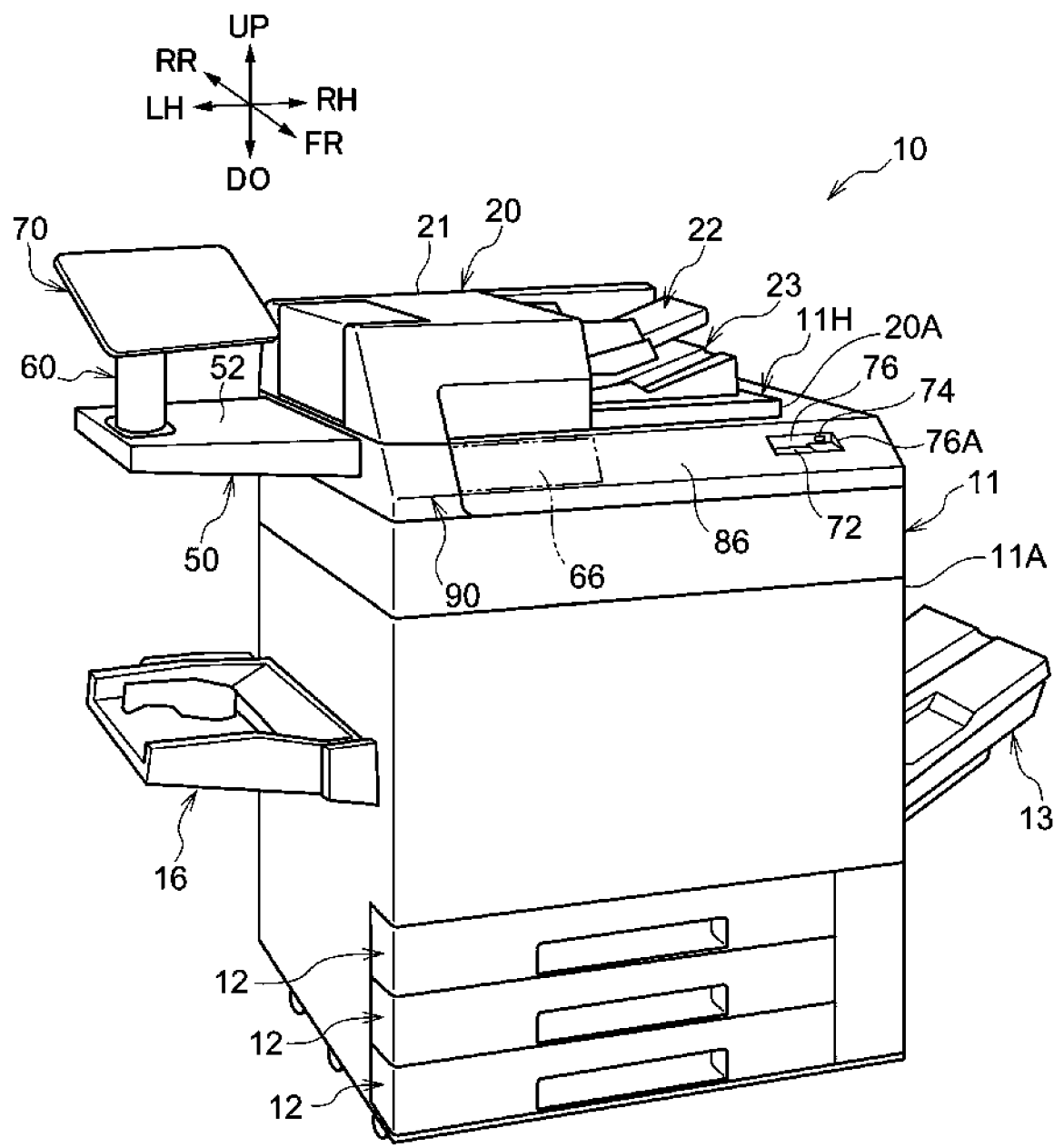
FIG. 2 is a perspective view of the image forming apparatus present according to the exemplary embodiment.

An image forming apparatus 10 according to the present exemplary embodiment will be described. FIG. 1 is a front view of the image forming apparatus 10. FIG. 2 is a perspective view of the image forming apparatus 10.

In the drawings, arrow UP shows an upward (more specifically, vertically upward) direction of the apparatus, and arrow DO shows a downward (more specifically, vertically downward) direction of the apparatus. In addition, arrow LH shows a leftward direction of the apparatus, and arrow RH shows a rightward direction of the apparatus. In addition, arrow FR shows a forward direction of the apparatus, and arrow RR shows a rearward direction of the apparatus. These directions are defined for convenience of description, and the structure of the apparatus is not limited to theses directions. The directions of the apparatus may be referred to without the term "apparatus". For example, the "upward direction of the apparatus" may be referred to simply as the "upward direction".

In addition, in the following description, the term "up-down direction" may be used to mean either "both upward and downward directions" or "one of the upward and downward directions". The term "left-right direction" may be used to mean either "both leftward and rightward directions" or "one of the leftward and rightward directions". The "left-right direction" may also be referred to as a sideways direction, a lateral direction, or a horizontal direction. The term "front-rear direction" may be used to mean either "both forward and rearward directions" or "one of the forward and rearward directions". The "front-rear direction" may also be referred to as a sideways direction, a lateral direction, or a horizontal direction. The up-down direction, the left-right direction, and the front-rear direction cross each other (more specifically, are orthogonal to each other).

In the figures, a circle with an X in the middle represents an arrow going into the page. In addition, a circle with a dot in the middle represents an arrow coming out of the page.

The image forming apparatus 10 illustrated in FIGS. 1 and 2 is an apparatus that forms an image. More specifically, as illustrated in FIGS. 1 and 2, the image forming apparatus 10 includes an image forming apparatus body 11, medium storage units 12, a manual feed tray 16, a medium output unit 13, a reading-unit receiving surface 82 (see FIG. 3), a document receiving surface 84 (see FIG. 3), an inclined surface 86, a side surface 88 (see FIG. 3), a projecting portion 90, an acquisition unit 66, a clip receiver 72, an insertion slot 74, an image forming unit 18, a reading unit 20, a mount 50, and an operation unit 70.

Components of the image forming apparatus 10 will now be described.

Image Forming Apparatus Body 11

The image forming apparatus body 11 illustrated in FIGS. 1 and 2 is an example of an apparatus body in which structural components of the image forming apparatus 10 are provided. As illustrated in FIGS. 1 and 2, the image forming apparatus body 11 is substantially rectangular-parallelepiped-shaped. More specifically, the image forming apparatus body 11 includes a housing 11A that houses the structural components of the image forming apparatus 10.

Medium Storage Units 12

The medium storage units 12 illustrated in FIGS. 1 and 2 are portions of the image forming apparatus 10 that store recording media. The recording media stored in the medium storage units 12 are supplied to the image forming unit 18. The recording media may be, for example, paper sheets.

Manual Feed Tray 16

The manual feed tray 16 illustrated in FIGS. 1 and 2 is a portion of the image forming apparatus 10 that receives recording media. A tray is a member on which the recording media are stacked. The term "manual feed" refers to an operation in which a user of the image forming apparatus 10 manually places the recording media on the tray. Accordingly, the manual feed tray 16 is a member on which the recording media are manually placed by the user of the image forming apparatus 10.

As described above, the manual feed tray 16 is provided on the exterior (more specifically, on the left side) of the image forming apparatus body 11, and is pivotable about the bottom thereof to be opened and closed with respect to the image forming apparatus body 11. In FIGS. 1 and 2, the manual feed tray 16 is open with respect to the image forming apparatus body 11.

The recording media are placed on the manual feed tray 16 while the manual feed tray 16 is open with respect to the image forming apparatus body 11. The recording media placed on the manual feed tray 16 may be, for example, types of recording media that cannot be fed from the medium storage units 12 or that are not suitable to be fed from the medium storage units 12. Examples of such types of recording media include cardboards, postcards, envelopes, non-standard sized paper sheets, and resin films.

Medium Output Unit 13

The medium output unit 13 illustrated in FIGS. 1 and 2 is an example of an output unit to which a recording medium is output after an image is formed thereon in the image forming apparatus 10. The medium output unit 13 is provided on the exterior (more specifically, on the right side) of the image forming apparatus body 11. A recording medium on which an image has been formed by the image forming unit 18 is output from the image forming apparatus body 11 to the medium output unit 13.

Reading-Unit Receiving Surface 82, Document Receiving Surface 84, and Inclined Surface 86

Figure 3:
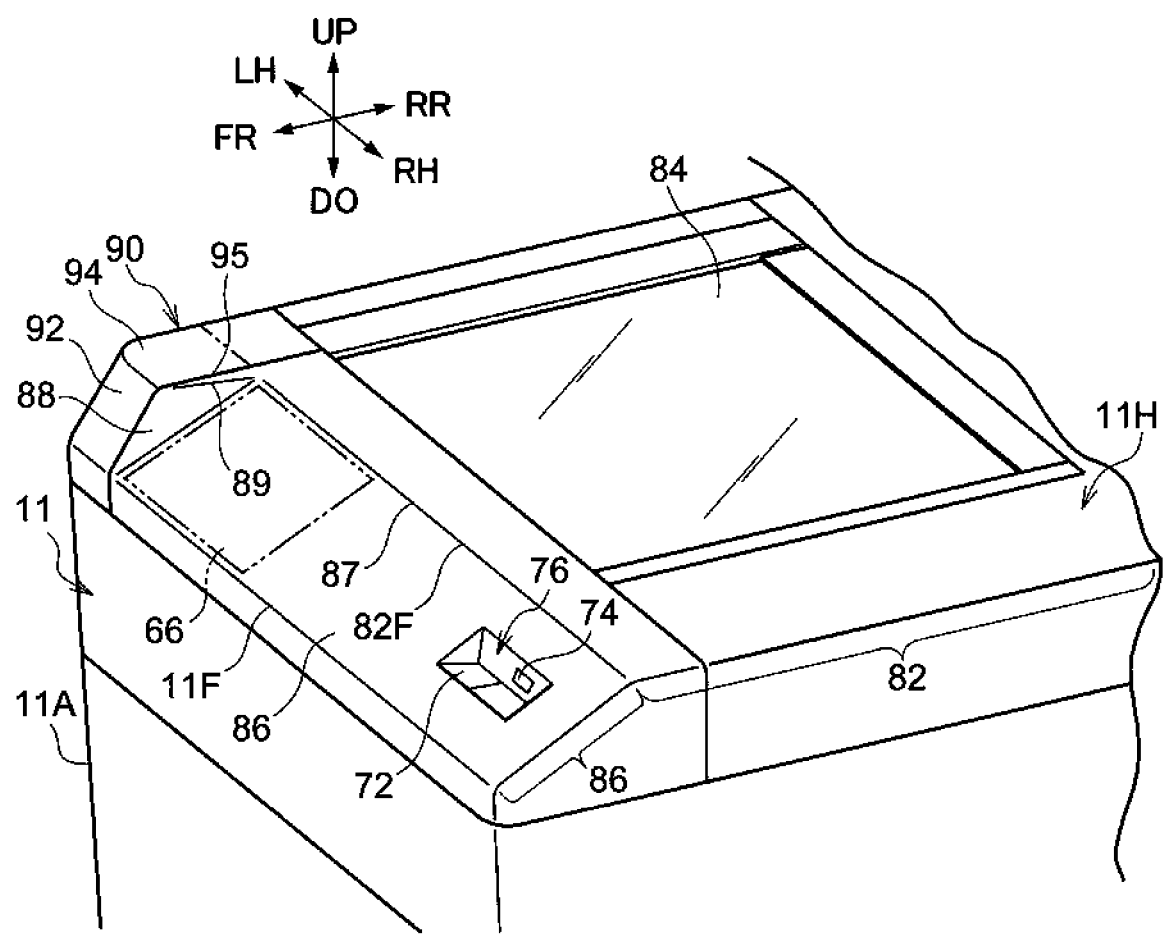
FIG. 3 is a perspective view of the image forming apparatus according to the exemplary embodiment from which a reading unit is omitted.

As illustrated in FIG. 3, the reading-unit receiving surface 82, the document receiving surface 84, and the inclined surface 86 are provided on an upper surface 11H of the image forming apparatus body 11. The upper surface 11H of the image forming apparatus body 11 is a surface that faces upward and that is visible from above.

The reading-unit receiving surface 82, which is an example of a rear portion, is a surface on which the reading unit 20 is placed. The reading-unit receiving surface 82 is a surface disposed behind a front end 11F of the upper surface 11H, and is composed of a horizontal surface.

The document receiving surface 84, which is an example of a receiving surface, is a surface on which a document G (see FIG. 11) is placed. The document receiving surface 84 is a surface disposed behind the front end 11F of the upper surface 11H, and is composed of a horizontal surface. The document receiving surface 84 is provided on a portion of the reading-unit receiving surface 82. More specifically, the document receiving surface 84 is formed of platen glass. An image on the document G placed on the document receiving surface 84 is read by a reading device (not illustrated) disposed below the document receiving surface 84.

The inclined surface 86 is continuously inclined downward from a front end 82F of the reading-unit receiving surface 82 to the front end 11F of the upper surface 11H. The inclined surface 86 is provided on a front portion of the upper surface 11H of the image forming apparatus body 11. No operation unit used by the user to perform an input operation is disposed on the inclined surface 86. Here, the input operation includes an operation for issuing an instruction for executing at least one of the image forming process and an image reading process in the image forming apparatus 10. The input operation does not include a placement operation of placing an information carrier 69 described below (see FIG. 7) on the acquisition unit 66, an insertion operation of inserting a terminal 71 into the insertion slot 74 (see FIG. 9), or an on/off operation of turning on and off the power of the image forming apparatus 10. Therefore, the above-described operation unit does not include an operation unit, such as an operation button, for performing the placement operation, the insertion operation, or the on/off operation. The above-described operation unit includes an operation button and a touch panel display that enable the operation for issuing an instruction for executing at least one of the image forming process and the image reading process. The inclined surface 86 does not have any display screen (for example, a display including a touch panel display) that displays information to be presented to the user.

The inclined surface 86 is formed to extend continuously to an end of the upper surface 11H of the image forming apparatus body 11 at a second side (more specifically, the right side). In other words, the inclined surface 86 is formed to extend continuously to an end of the upper surface 11H opposite to an end at which the projecting portion 90 is provided.

A projection at a boundary 87 between the reading-unit receiving surface 82 and the inclined surface 86 (that is, at the front end 82F of the reading-unit receiving surface 82) is 3 mm or less in a direction perpendicular to the inclined surface 86. Here, 3 mm or less includes 0 mm. In other words, a structure in which no projection (that is, projecting portion) that projects in the direction perpendicular to the inclined surface 86 is formed at the boundary 87 between the reading-unit receiving surface 82 and the inclined surface 86 is included. In the present exemplary embodiment, no projection is formed at the boundary 87.

Projecting Portion 90 and Side Surface 88

Figure 4:
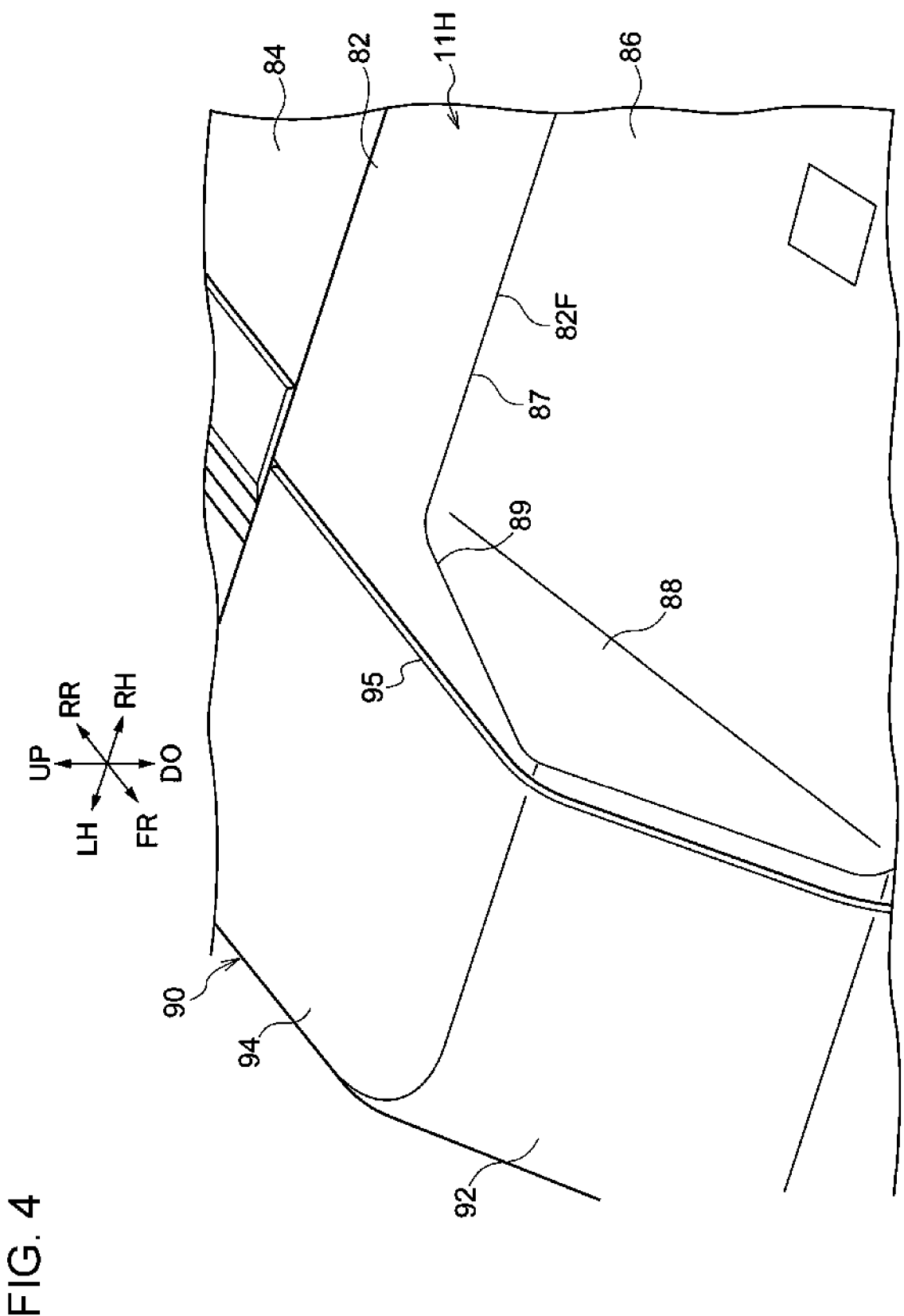
FIG. 4 is a perspective view of a region including a projecting portion according to the exemplary embodiment.

As illustrated in FIGS. 3 and 4, the projecting portion 90 is provided on the front portion of the image forming apparatus body 11 at a position on a first side (more specifically, the left side) of the inclined surface 86 in the left-right direction. The projecting portion 90 projects forward and upward with respect to the inclined surface 86.

Figure 5:
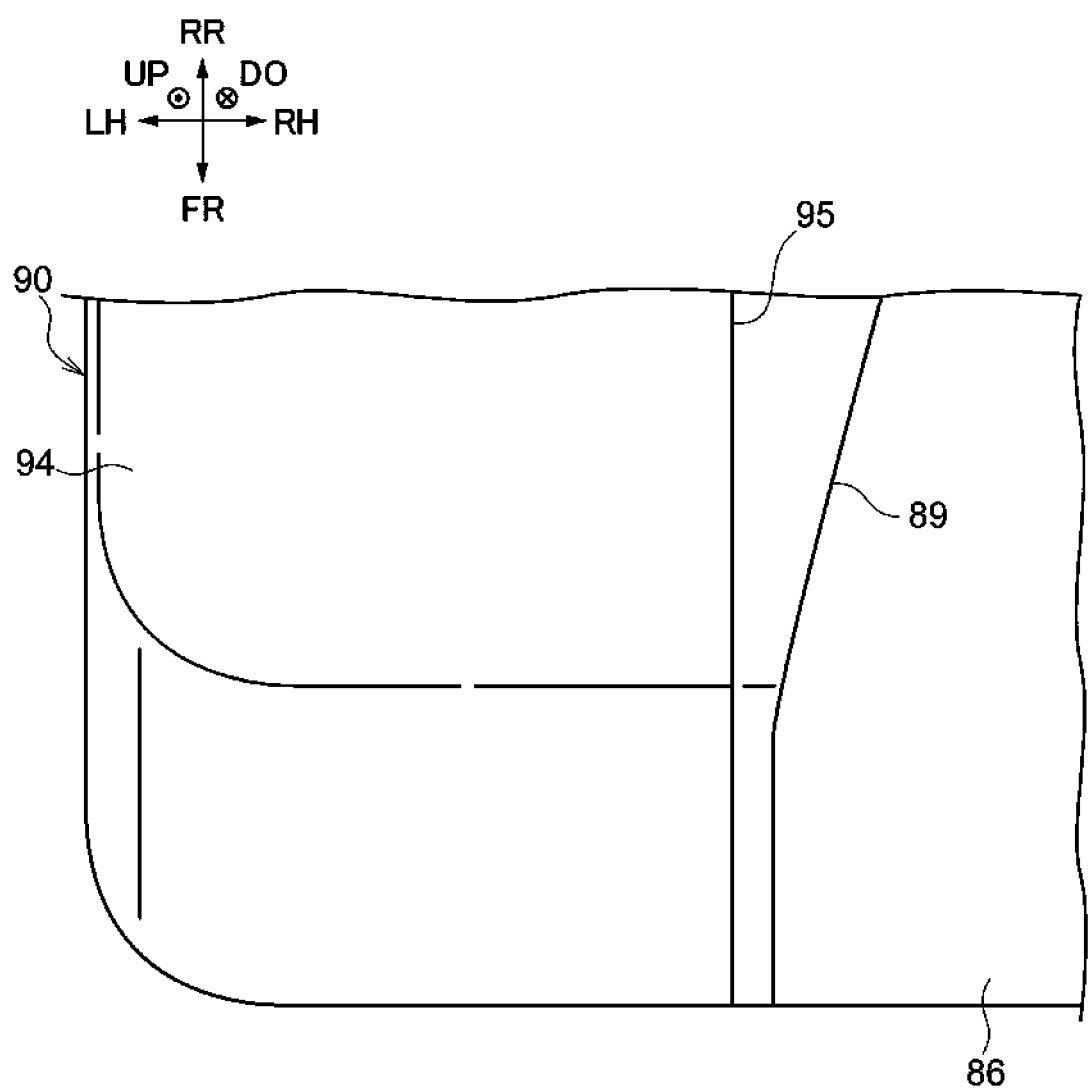
FIG. 5 is a plan view of the region including the projecting portion according to the exemplary embodiment.

As illustrated in FIGS. 3 and 4, the side surface 88 is provided on the projecting portion 90 at the second side (more specifically, the right side) in the left-right direction, and extends upward from an end of the inclined surface 86 at the first side (more specifically, the left side). As illustrated in FIGS. 4 and 5, the distance between an edge 95 of an upper surface 94 of the projecting portion 90 along the front-rear direction at the second side (more specifically, the right side) and an upper edge 89 of the side surface 88 along the front-rear direction increases in a rearward direction in plan view.

Angles of Projecting Portion 90 and Inclined Surface 86

Figure 6:
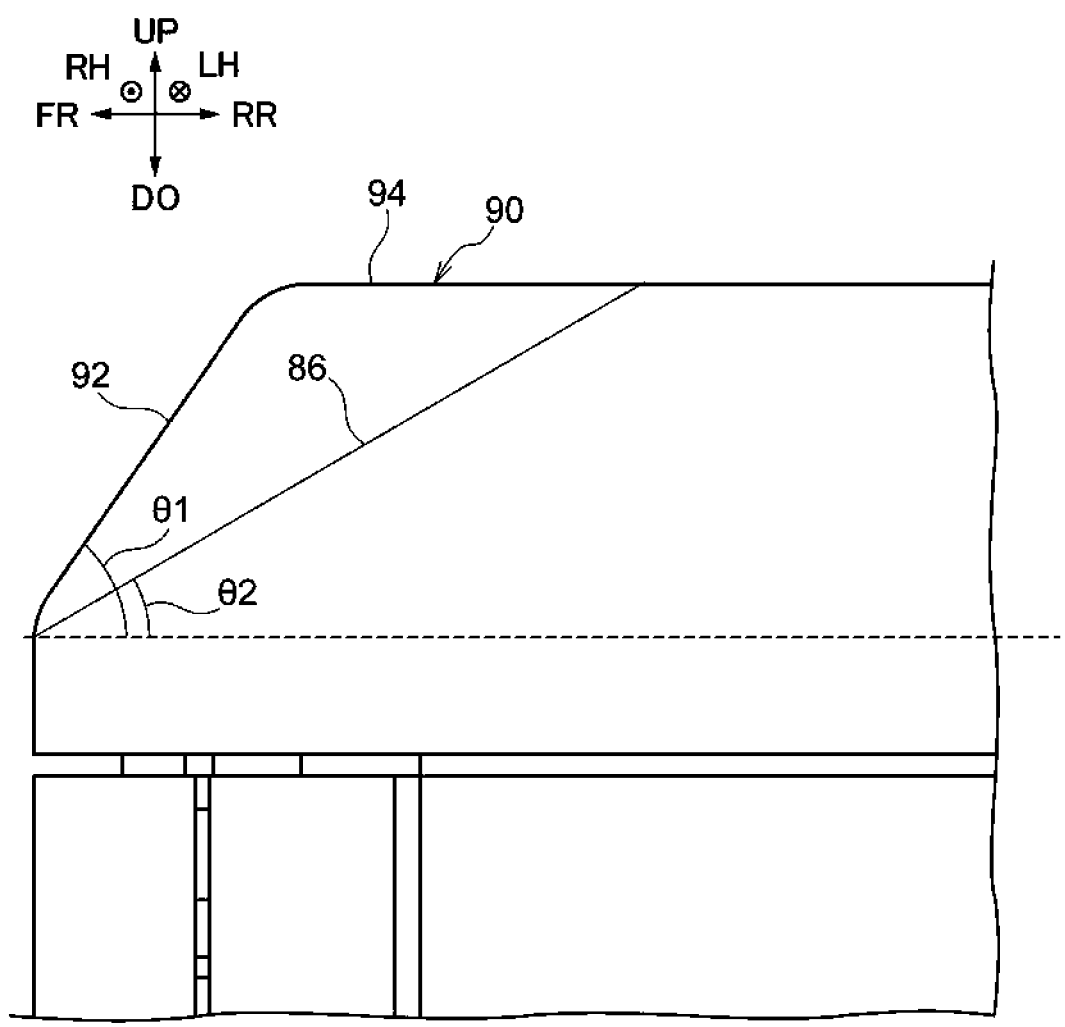
FIG. 6 is a side view of a front portion of the image forming apparatus according to the exemplary embodiment.

An angle θ1 (see FIG. 6) of a front surface 92 of the projecting portion 90 with respect to a horizontal direction is in the range of 40 degrees or more and 90 degrees or less. An angle θ2 (see FIG. 6) of the inclined surface 86 with respect to the horizontal direction is less than the angle of the front surface 92 of the projecting portion 90 with respect to the horizontal direction. More specifically, the angle of the inclined surface 86 with respect to the horizontal direction is in the range of more than 0 degrees and less than 40 degrees.

Acquisition Unit 66

As illustrated in FIGS. 1, 2, 3, and 7, the acquisition unit 66 is provided at a predetermined position on the inclined surface 86. More specifically, the acquisition unit 66 is disposed on the inclined surface 86 at the first side (more specifically, the left side).

When the information carrier 69 (see FIG. 7) carrying identification (ID) information of the user of the image forming apparatus 10 is placed at the predetermined position, the acquisition unit 66 acquires the identification information from the information carrier 69. Accordingly, the user is authenticated by the image forming apparatus 10. The information carrier 69 may be, for example, a card or a mobile terminal carrying the identification information.

Clip Receiver 72 and Insertion Slot 74

Figure 8:
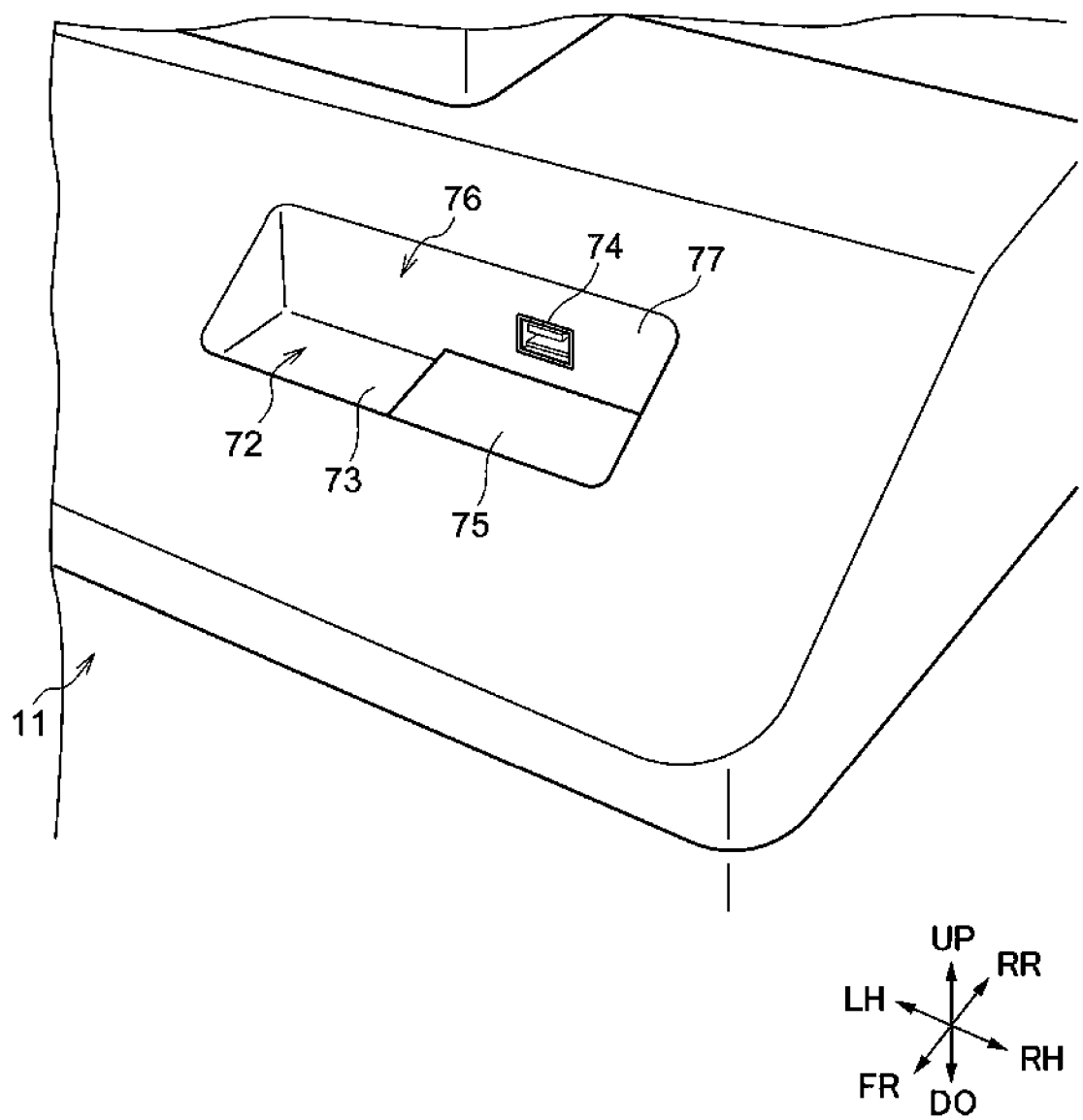
FIG. 8 is a perspective view of a clip receiver and an insertion slot according to the exemplary embodiment.

The clip receiver 72 illustrated in FIG. 8 is a portion of the image forming apparatus 10 that receives a clip. The insertion slot 74 illustrated in FIG. 8 is a slot into which the terminal 71 (more specifically, for example, a USB terminal) is inserted as illustrated in FIG. 9.

As illustrated in FIG. 8, the clip receiver 72 and the insertion slot 74 are arranged next to each other in the left-right direction in one recess 76. The recess 76 is formed in the inclined surface 86.

Figure 9:
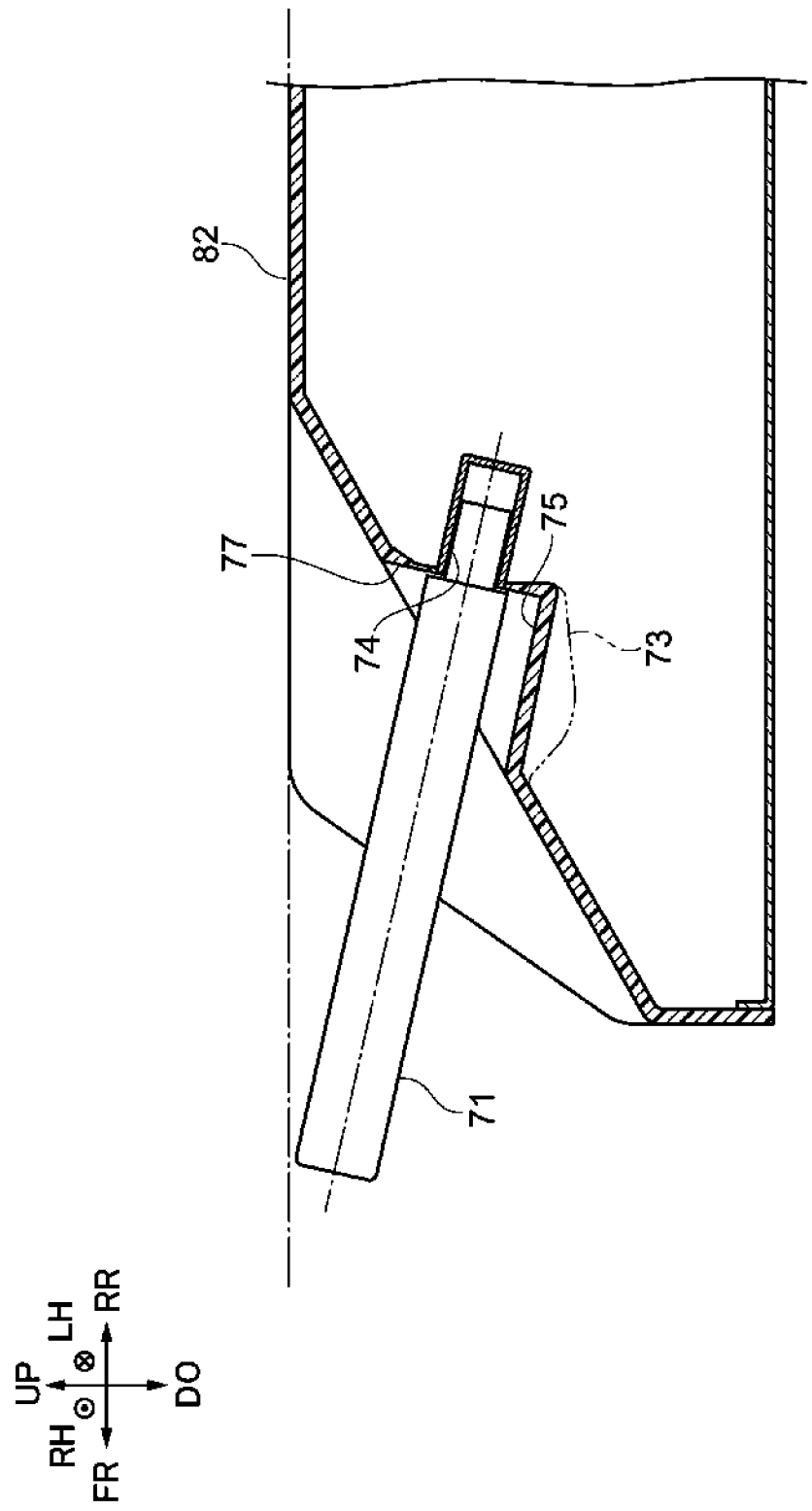
FIG. 9 is a side sectional view of the clip receiver and the insertion slot according to the exemplary embodiment.

As illustrated in FIGS. 8 and 9, the insertion slot 74 is formed in a front facing surface 77 of the recess 76. A bottom surface 75 below the insertion slot 74 is positioned above a bottom surface 73 of the clip receiver 72. As illustrated in FIG. 9, the bottom surface 73 of the clip receiver 72 is curved concavely downward in side view. The bottom surface 75 is a flat surface extending in a direction in which the terminal 71 is inserted into the insertion slot 74.

Figure 7:
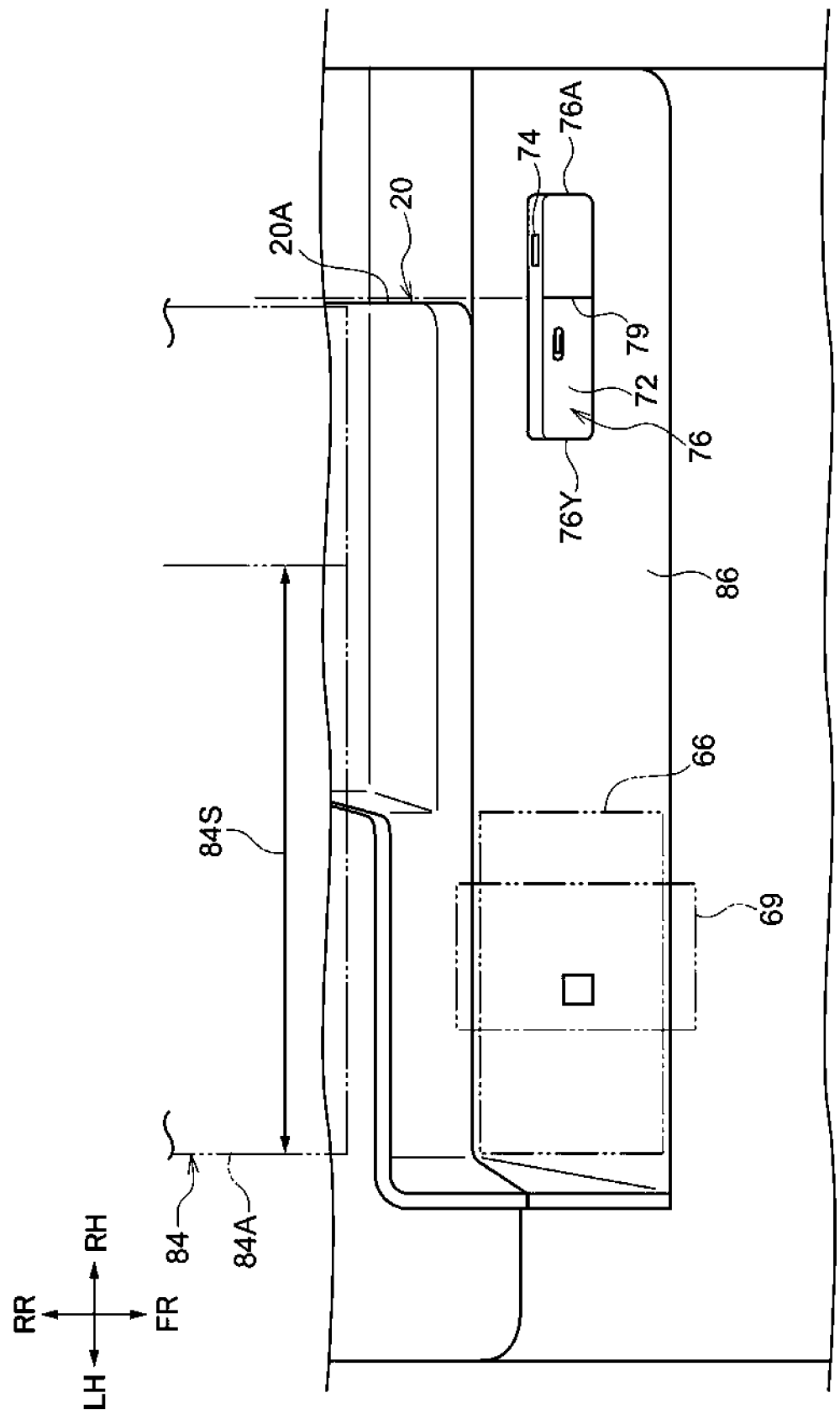
FIG. 7 is a plan view of the front portion of the image forming apparatus according to the exemplary embodiment.

As illustrated in FIG. 7, an end 76Y of the recess 76 at the first side (more specifically, the left side) in the left-right direction is disposed on the second side (more specifically, the right side) of a region 84S extending over 70 percent of the document receiving surface 84 from an end 84A of the document receiving surface 84 at the first side (more specifically, the left side) in the left-right direction.

The distance from a boundary 79 between the bottom surface 75 below the insertion slot 74 and the bottom surface 73 of the clip receiver 72 to an end of the reading unit 20 at the second side (more specifically, the right side) in the left-right direction is within ±5 mm.

The angle of the direction in which the terminal 71 is inserted into the insertion slot 74 and the position of the insertion slot 74 are set so that the upper end of the terminal 71 inserted in the insertion slot 74 is below the height of the reading-unit receiving surface 82.

The clip receiver 72 is used, for example, to temporarily hold a clip that binds document sheets together. Accordingly, the user may, for example, perform the following operation. That is, the user places the document sheets on a document receiver 22 after removing the clip binding the document sheets together and placing the clip on the clip receiver 72, executes an image reading operation, and then picks up the clip from the clip receiver 72 and binds the document sheets together again after the image reading operation is completed.

Image Forming Unit 18

The image forming unit 18 illustrated in FIG. 1 has a function of forming an image on a recording medium. The image forming unit 18 is, for example, an inkjet image forming unit that forms an image on a recording medium with ink or an electrophotographic image forming unit that forms an image on a recording medium with toner.

The inkjet image forming unit, for example, forms an image on a recording medium by ejecting ink droplets from an ejection unit toward the recording medium. Alternatively, the inkjet image forming unit may form an image on a recording medium by ejecting ink droplets from an ejection unit toward a transfer body and transferring the ink droplets from the transfer body to the recording medium.

The electrophotographic image forming unit, for example, forms an image on a recording medium by performing charging, exposure, developing, and transfer processes. Alternatively, the electrophotographic image forming unit may form an image on a recording medium by performing charging, exposure, developing, and transfer processes to form an image on a transfer body and transferring the image from the transfer body to the recording medium.

Examples of the image forming unit are not limited to the above-described inkjet image forming unit and the above-described electrophotographic image forming unit, and also include various other image forming units.

Reading Unit 20

The reading unit 20 illustrated in FIGS. 1 and 2 has a function of reading an image on a document while transporting the document in the image forming apparatus 10. As illustrated in FIGS. 1 and 2, the reading unit 20 is provided on the reading-unit receiving surface 82 of the image forming apparatus body 11 such that the reading unit 20 is openable and closable. More specifically, the reading unit 20 opens and closes with respect to the image forming apparatus body 11 by pivoting about a lower rear portion thereof such that a front portion thereof moves in the up-down direction. FIGS. 1 and 2 illustrate the reading unit 20 that is closed with respect to the image forming apparatus body 11.

More specifically, the reading unit 20 includes a housing 21, the document receiver 22, a document output unit 23, a reading device (not illustrated), and a transport mechanism (not illustrated). The reading unit 20 causes the transport mechanism to transport the document supplied from the document receiver 22, and causes the reading device to read the image on the document. The reading device may be, for example, a contact image sensor (CIS).

The document receiver 22 is a portion of the image forming apparatus 10 that receives the document. As illustrated in FIGS. 1 and 2, the document receiver 22 is disposed on the right side of the housing 21. The document placed on the document receiver 22 is supplied to the reading unit 20. The document may be, for example, a paper sheet.

The document output unit 23 is a portion of the image forming apparatus 10 to which the document is output. As illustrated in FIGS. 1 and 2, the document output unit 23 is disposed on the right side of the housing 21 and below the document receiver 22. The document is output to the document output unit 23 after the image on the document is read by the reading unit 20.

Mount 50

Figure 10:
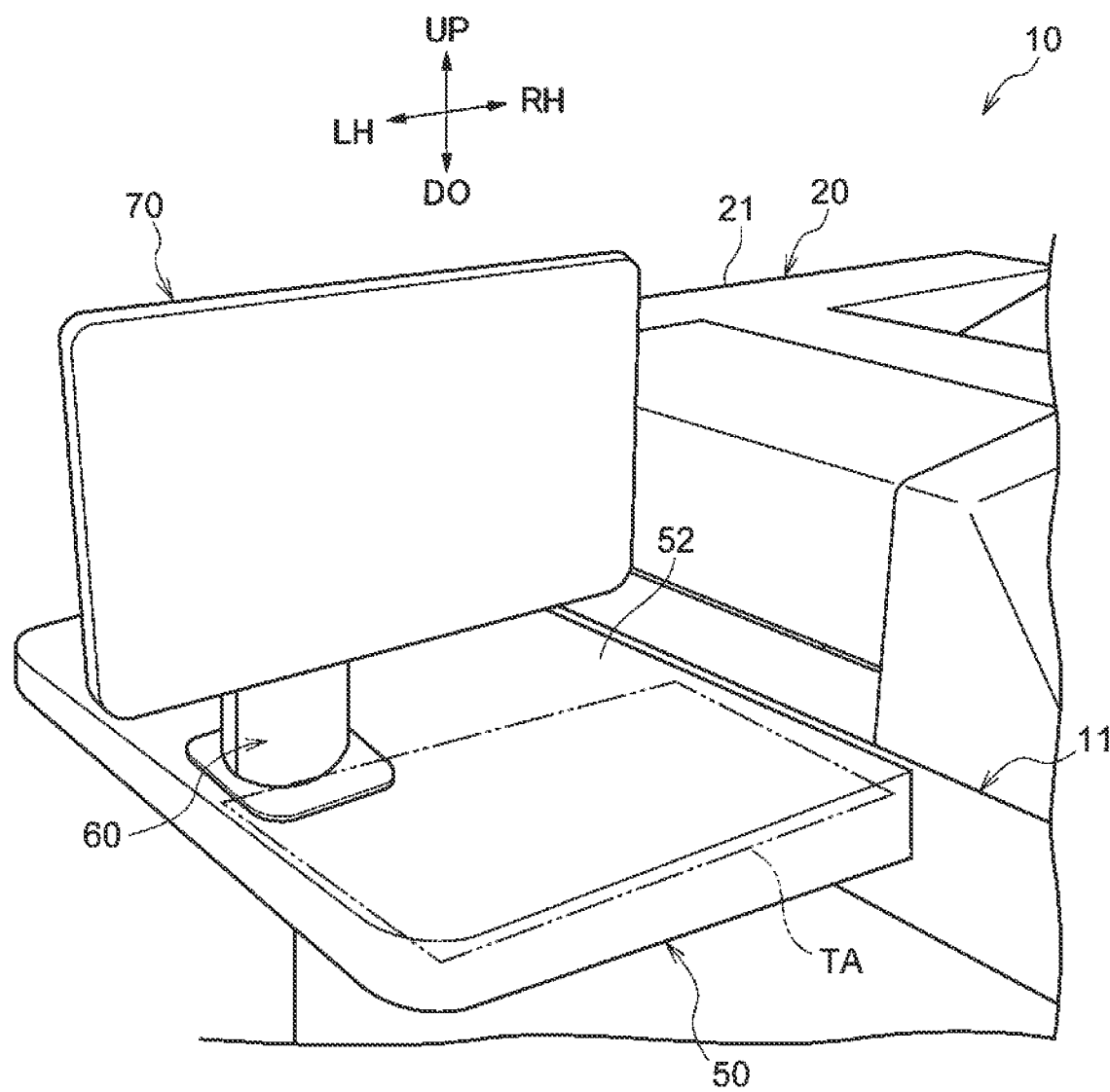
FIG. 10 is a perspective view of a mount, a support member, and a display unit according to the exemplary embodiment.

The mount 50 illustrated in FIG. 10 and other figures has a function of receiving an object TA. The mount 50 has an upper surface 52 that serves as a receiving surface on which the object TA is placed.

When the user uses the image forming apparatus 10, the user may temporarily place an object that is not used on the mount 50 as the object TA. For example, when the user has plural document sheets including one or more document sheets with an image to be read by the reading unit 20, the user may temporarily place the document sheets other than those to be read on the mount 50 as the object TA.

The mount 50 is disposed on the first side (more specifically, the left side) of the projecting portion 90 in the left-right direction. More specifically, as illustrated in FIG. 10, the mount 50 projects leftward from the left side surface of an upper portion of the image forming apparatus body 11 so that the upper surface 52 extends along the document receiving surface 84 of the image forming apparatus body 11. The mount 50 is disposed above the manual feed tray 16 (see FIG. 1).

Operation Unit 70

The operation unit 70 illustrated in FIG. 10 and other figures is an example of an operation unit used by the user to perform an input operation. The operation unit 70 also has a function of displaying an operation screen and various messages, such as operation instructions, regarding the image forming process. More specifically, the operation unit 70 may be, for example, a liquid crystal display or an organic electro-luminescence (EL) display. More specifically, the operation unit 70 is composed of a touch panel display having both a display function and an operation function. The touch panel display is a touch panel of a resistive film type or an electrostatic capacitance type, and detects a touch operation performed by the user.

Thus, the operation unit 70 is a structural component that provides both an operation and a display regarding the image forming process. The operation unit 70 is provided above the upper surface 52 of the mount 50, and is supported by a support member 60 that extends upward from the upper surface 52 of the mount 50. Thus, the operation unit 70 is disposed on the first side (more specifically, the left side) of the projecting portion 90 in the left-right direction.

Positional Relationship Between Components of Image Forming Apparatus 10

The positional relationship between the reading unit 20, the operation unit 70, the document receiver 22, the clip receiver 72, the recess 76 in which the clip receiver 72 is disposed, and the medium output unit 13 will now be described (see FIGS. 1 and 2).

As illustrated in FIGS. 1 and 2, the operation unit 70 is disposed on the first side (more specifically, the left side) of the reading unit 20 in the left-right direction. The document receiver 22 is provided on a portion of the reading unit 20 at the second side (more specifically, the right side) in the left-right direction.

The clip receiver 72 is provided on the image forming apparatus body 11 at a position on the second side (more specifically, the right side) of the document receiver 22. The medium output unit 13 is provided on the image forming apparatus body 11 at a position on the second side (more specifically, the right side) of the clip receiver 72.

The recess 76 in which the clip receiver 72 and the insertion slot 74 are provided is disposed such that an end thereof at the second side (more specifically, the right end) 76A is disposed on the second side (more specifically, the right side) of an end of the document receiver 22 at the second side (more specifically, the right end) 20A.

The components of the image forming apparatus 10 may instead be arranged assuming that the first side in the left-right direction is the right side and the second side in the left-right direction is the left side.

Operation of Present Exemplary Embodiment

In the present exemplary embodiment, as illustrated in FIGS. 3 and 4, the projecting portion 90 is provided on the front portion of the upper surface of the image forming apparatus body 11 at a position on the first side (more specifically, the left side) of the inclined surface 86 in the left-right direction. The projecting portion 90 projects forward and upward with respect to the inclined surface 86.

In addition, in the present exemplary embodiment, as illustrated in FIGS. 1, 2, 3, and 7, the acquisition unit 66 is provided at a predetermined position on the inclined surface 86.

In addition, in the present exemplary embodiment, a projection at the boundary 87 between the reading-unit receiving surface 82 and the inclined surface 86 (that is, at the front end 82F of the reading-unit receiving surface 82, see FIG. 3) is 3 mm or less in the direction perpendicular to the inclined surface 86.

In addition, in the present exemplary embodiment, the angle θ1 (see FIG. 6) of the front surface 92 of the projecting portion 90 with respect to the horizontal direction is in the range of 40 degrees or more and 90 degrees or less. The angle θ2 (see FIG. 6) of the inclined surface 86 with respect to the horizontal direction is less than the angle of the front surface 92 of the projecting portion 90 with respect to the horizontal direction.

In addition, in the present exemplary embodiment, the distance between the edge 95 of the upper surface 94 of the projecting portion 90 along the front-rear direction at the second side (more specifically, the right side) and the upper edge 89 of the side surface 88 along the front-rear direction increases in the rearward direction in plan view.

In addition, in the present exemplary embodiment, the inclined surface 86 is formed to extend continuously to the end of the upper surface 11H of the image forming apparatus body 11 at the second side (more specifically, the right side).

In addition, in the present exemplary embodiment, as illustrated in FIG. 8, the clip receiver 72 and the insertion slot 74 are arranged next to each other in the left-right direction in one recess 76.

In addition, in the present exemplary embodiment, the bottom surface 75 below the insertion slot 74 is positioned above the bottom surface 73 of the clip receiver 72.

In addition, in the present exemplary embodiment, as illustrated in FIG. 9, the bottom surface 73 of the clip receiver 72 is curved in side view.

In addition, in the present exemplary embodiment, as illustrated in FIG. 7, the end 76Y of the recess 76 at the first side (more specifically, the left side) in the left-right direction is disposed on the second side (more specifically, the right side) of the region 84S extending over 70 percent of the document receiving surface 84 from the end 84A of the document receiving surface 84 at the first side (more specifically, the left side) in the left-right direction.

In addition, in the present exemplary embodiment, the distance from the boundary 79 between the bottom surface 75 below the insertion slot 74 and the bottom surface 73 of the clip receiver 72 to the end of the reading unit 20 at the second side (more specifically, the right side) in the left-right direction is within ±5 mm.

Modifications of Reading-Unit Receiving Surface 82 and Inclined Surface 86

Although in the present exemplary embodiment a projection at the boundary 87 between the reading-unit receiving surface 82 and the inclined surface 86 (that is, at the front end 82F of the reading-unit receiving surface 82, see FIG. 3) is 3 mm or less in the direction perpendicular to the inclined surface 86, the reading-unit receiving surface 82 and the inclined surface 86 are not limited to this. The projection may be more than 3 mm in the direction perpendicular to the inclined surface 86.

Although in the present exemplary embodiment the angle θ2 (see FIG. 6) of the inclined surface 86 with respect to the horizontal direction is less than the angle of the front surface 92 of the projecting portion 90 with respect to the horizontal direction, the angle θ2 is not limited to this. For example, the angle θ2 (see FIG. 6) of the inclined surface 86 with respect to the horizontal direction may be greater than or equal to the angle θ1 (see FIG. 6) of the front surface 92 of the projecting portion 90 with respect to the horizontal direction.

Although in the present exemplary embodiment the distance between the edge 95 of the upper surface 94 of the projecting portion 90 along the front-rear direction at the second side (more specifically, the right side) and the upper edge 89 of the side surface 88 along the front-rear direction increases in the rearward direction in plan view, the structure is not limited to this. For example, the edge 95 of the upper surface 94 of the projecting portion 90 along the front-rear direction at the second side (more specifically, the right side) of the upper surface 94 may be parallel to the upper edge 89 of the side surface 88 along the front-rear direction in plan view.

Modifications of Projecting Portion 90 and Side Surface 88

Although in the present exemplary embodiment the angle θ1 (see FIG. 6) of the front surface 92 of the projecting portion 90 with respect to the horizontal direction is in the range of 40 degrees or more and 90 degrees or less, the angle θ1 is not limited to this. For example, the angle θ1 (see FIG. 6) may be in the range of more than 0 degrees and 40 degrees or less, or in the range of more than 90 degrees and 180 degrees or less.

Although in the present exemplary embodiment the inclined surface 86 is formed to extend continuously to the end of the upper surface 11H of the image forming apparatus body 11 at the second side (more specifically, the right side), the inclined surface 86 is not limited to this. For example, the inclined surface 86 may extend only to a position on the first side of the end of the upper surface 11H of the image forming apparatus body 11 at the second side (more specifically, the right side).

Modifications of Acquisition Unit 66

Although in the present exemplary embodiment the acquisition unit 66 is provided at a predetermined position on the inclined surface 86 as illustrated in FIGS. 1, 2, 3, and 7, the acquisition unit 66 is not limited to this. For example, the acquisition unit 66 may be provided on the reading-unit receiving surface 82 of the image forming apparatus body 11.

Modifications of Mount 50

Although in the present exemplary embodiment the mount 50 is disposed on the left side of the image forming apparatus body 11, the mount 50 is not limited to this. For example, the mount 50 may be disposed on the right side or in front of the image forming apparatus body 11.

Modifications of Operation unit 70

Although in the present exemplary embodiment the operation unit 70 is a structural component that provides both an operation and a display regarding the image forming process, the operation unit 70 is not limited to this. An example of the operation unit may be a structural component that provides only an operation regarding the image forming process.

Modifications of Clip Receiver 72 and Other Components

Although in the present exemplary embodiment the clip receiver 72 and the insertion slot 74 are arranged next to each other in the left-right direction in one recess 76 as illustrated in FIG. 8, the clip receiver 72 and the insertion slot 74 are not limited to this. For example, the clip receiver 72 may be disposed above the insertion slot 74.

Although in the present exemplary embodiment the bottom surface 75 below the insertion slot 74 is positioned above the bottom surface 73 of the clip receiver 72, the arrangement is not limited to this. For example, the bottom surface 75 below the insertion slot 74 may be at the same height as the bottom surface 73 of the clip receiver 72.

Although in the present exemplary embodiment the bottom surface 73 of the clip receiver 72 is curved in side view as illustrated in FIG. 9, the clip receiver 72 is not limited to this. For example, the bottom surface 73 of the clip receiver 72 may be a flat surface.

Although in the present exemplary embodiment the end 76Y of the recess 76 at the first side (more specifically, the left side) in the left-right direction is disposed on the second side (more specifically, the right side) of the region 84S extending over 70 percent of the document receiving surface 84 from the end 84A of the document receiving surface 84 at the first side (more specifically, the left side) in the left-right direction as illustrated in FIG. 7, the recess 76 is not limited to this. For example, the end 76Y of the recess 76 at the first side (more specifically, the left side) in the left-right direction may be disposed on the first side (more specifically, the left side) of the region 84S extending over 70 percent of the document receiving surface 84 from the end 84A of the document receiving surface 84 at the first side (more specifically, the left side) in the left-right direction.

Although in the present exemplary embodiment the distance from the boundary 79 between the bottom surface 75 below the insertion slot 74 and the bottom surface 73 of the clip receiver 72 to the end of the reading unit 20 at the second side (more specifically, the right side) in the left-right direction is within ±5 mm, the structure is not limited to this. For example, the distance from the boundary 79 between the bottom surface 75 below the insertion slot 74 and the bottom surface 73 of the clip receiver 72 to the end of the reading unit 20 at the second side (more specifically, the right side) in the left-right direction may be beyond ±5 mm.

Although in the present exemplary embodiment the clip receiver 72 is provided on the image forming apparatus body 11 at a position on the second side (more specifically, the right side) of the document receiver 22, the clip receiver 72 is not limited to this. For example, the clip receiver 72 may be provided on the image forming apparatus body 11 at a position on the first side (more specifically, the left side) of the document receiver 22.

The present disclosure is not limited to the above-described exemplary embodiment, and various modifications, alterations, and improvements are possible without departing from the spirit of the present disclosure. For example, the above-described modifications may be applied in combinations with each other as appropriate.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
    an apparatus body having a receiving surface on which a document is placed and that is provided on a rear portion of an upper surface, the rear portion being positioned behind a front end of the upper surface;
    a reading unit provided on the rear portion such that the reading unit is openable and closable, the reading unit reading an image on the document while transporting the document;
    an inclined surface on which no operation unit used by a user to perform an input operation is disposed, the inclined surface being continuously inclined downward from a front end of the rear portion to the front end of the upper surface; and
    a projecting portion provided on a front portion of the apparatus body at a position on a first side of the inclined surface in a left-right direction, the projecting portion projecting forward and upward with respect to the inclined surface.

2. The image forming apparatus according to claim 1, further comprising:
    an acquisition unit disposed at a predetermined position on the inclined surface, the acquisition unit acquiring identification information of the user of the image forming apparatus from an information carrier carrying the identification information when the information carrier is placed at the predetermined position.

3. The image forming apparatus according to claim 2, wherein a projection at a boundary between the rear portion and the inclined surface is 3 mm or less in a direction perpendicular to the inclined surface.

4. The image forming apparatus according to claim 3, wherein the acquisition unit is disposed on the inclined surface at the first side,
    wherein an angle of a front surface of the projecting portion with respect to a horizontal direction is in a range of 40 degrees or more and 90 degrees or less, and
    wherein an angle of the inclined surface with respect to the horizontal direction is less than the angle of the front surface of the projecting portion with respect to the horizontal direction.

5. The image forming apparatus according to claim 1, further comprising:
    an operation unit disposed on the first side of the projecting portion and used by the user to perform an input operation; and
    a side surface provided on the projecting portion at a second side in the left-right direction, the side surface protruding upward from an end of the inclined surface at the first side,
    wherein a distance between an edge of the upper surface of the projecting portion along a front-rear direction at the second side and an upper edge of the side surface along the front-rear direction increases in a rearward direction in plan view.

6. The image forming apparatus according to claim 2, further comprising:
- an operation unit disposed on the first side of the projecting portion and used by the user to perform an input operation; and
- a side surface provided on the projecting portion at a second side in the left-right direction, the side surface protruding upward from an end of the inclined surface at the first side,
- wherein a distance between an edge of the upper surface of the projecting portion along a front-rear direction at the second side and an upper edge of the side surface along the front-rear direction increases in a rearward direction in plan view.

7. The image forming apparatus according to claim 3, further comprising:
- an operation unit disposed on the first side of the projecting portion and used by the user to perform an input operation; and
- a side surface provided on the projecting portion at a second side in the left-right direction, the side surface protruding upward from an end of the inclined surface at the first side,
- wherein a distance between an edge of the upper surface of the projecting portion along a front-rear direction at the second side and an upper edge of the side surface along the front-rear direction increases in a rearward direction in plan view.

8. The image forming apparatus according to claim 4, further comprising:
- an operation unit disposed on the first side of the projecting portion and used by the user to perform an input operation; and
- a side surface provided on the projecting portion at a second side in the left-right direction, the side surface protruding upward from an end of the inclined surface at the first side,
- wherein a distance between an edge of the upper surface of the projecting portion along a front-rear direction at the second side and an upper edge of the side surface along the front-rear direction increases in a rearward direction in plan view.

9. The image forming apparatus according to claim 1, further comprising:
- an operation unit disposed on the first side of the projecting portion and used by the user to perform an input operation,
- wherein the inclined surface continuously extends to an end of the upper surface of the apparatus body at a second side in the left-right direction.

10. The image forming apparatus according to claim 2, further comprising:
- an operation unit disposed on the first side of the projecting portion and used by the user to perform an input operation,
- wherein the inclined surface continuously extends to an end of the upper surface of the apparatus body at a second side in the left-right direction.

11. The image forming apparatus according to claim 3, further comprising:
- an operation unit disposed on the first side of the projecting portion and used by the user to perform an input operation,
- wherein the inclined surface continuously extends to an end of the upper surface of the apparatus body at a second side in the left-right direction.

12. The image forming apparatus according to claim 4, further comprising:
- an operation unit disposed on the first side of the projecting portion and used by the user to perform an input operation,
- wherein the inclined surface continuously extends to an end of the upper surface of the apparatus body at a second side in the left-right direction.

13. The image forming apparatus according to claim 5, wherein the inclined surface continuously extends to an end of the upper surface of the apparatus body at the second side in the left-right direction.

14. The image forming apparatus according to claim 6, wherein the inclined surface continuously extends to an end of the upper surface of the apparatus body at the second side in the left-right direction.

15. The image forming apparatus according to claim 7, wherein the inclined surface continuously extends to an end of the upper surface of the apparatus body at the second side in the left-right direction.

16. The image forming apparatus according to claim 1, wherein the inclined surface has one recess, and
- wherein a clip receiver that receives a clip and an insertion slot into which a terminal is inserted are arranged next to each other in the left-right direction in the recess.

17. The image forming apparatus according to claim 16, wherein the insertion slot is formed in a front facing surface of the recess, and
- wherein a bottom surface below the insertion slot is positioned above a bottom surface of the clip receiver.

18. The image forming apparatus according to claim 16, wherein the clip receiver has a bottom surface that is curved concavely downward in side view.

19. The image forming apparatus according to claim 16, wherein an end of the recess at the first side in the left-right direction is disposed on a second side of a region extending over 70 percent of the receiving surface from an end of the receiving surface at the first side in the left-right direction.

20. The image forming apparatus according to claim 16, wherein a distance from a boundary between a bottom surface below the insertion slot and a bottom surface of the clip receiver to an end of the reading unit at a second side in the left-right direction is within ±5 mm.

* * * * *